United States Patent [19]

Foerster

[11] Patent Number: 4,463,102
[45] Date of Patent: Jul. 31, 1984

[54] POLYOLEFIN POLYMERIZATION CATALYST CONTAINING STERICALLY UNHINDERED PHENOLIC COMPOUNDS (II)

[75] Inventor: Rolf F. Foerster, Morris, Ill.

[73] Assignee: Northern Petrochemical Company, Omaha, Nebr.

[21] Appl. No.: 461,693

[22] Filed: Jan. 28, 1983

Related U.S. Application Data

[63] Continuation-in-part of Ser. No. 322,979, Nov. 11, 1981, abandoned.

[51] Int. Cl.$^3$ .............................................. C08F 4/64
[52] U.S. Cl. ..................................... 502/127; 502/125; 502/126; 502/122; 502/124; 526/142; 526/141; 526/140
[58] Field of Search ............... 502/125, 126, 127, 122, 502/124

[56] References Cited

U.S. PATENT DOCUMENTS

| | | | |
|---|---|---|---|
| 3,150,122 | 9/1964 | Andersen et al. | 502/125 X |
| 3,345,351 | 10/1967 | McCall et al. | 502/126 X |
| 3,549,717 | 12/1970 | Itakura et al. | 502/124 X |
| 3,649,709 | 3/1972 | Medema et al. | 502/103 X |
| 4,048,415 | 9/1977 | Matsuzawa et al. | 502/125 X |

FOREIGN PATENT DOCUMENTS 1304556 1/1973 United Kingdom .

Primary Examiner—Patrick Garvin
Attorney, Agent, or Firm—Donald F. Haas

[57] ABSTRACT

A catalyst and a process for the preparation of homopolymers and copolymers of alpha monoolefins by means of a catalyst system comprising (1) a titanium halide of the formula

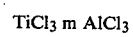

$TiCl_3$ m $AlCl_3$ where m is a number from 0 to 0.5, (2) a coordination complexing agent, the use of which is optional, and (3) an appropriate conventional aluminum-alkyl, the titanium halide (1) and the complexing agent (2), if used, having been milled together before use, wherein the catalyst system employed contains, as a further component (4), a sterically unhindered phenolic compound.

6 Claims, No Drawings

POLYOLEFIN POLYMERIZATION CATALYST CONTAINING STERICALLY UNHINDERED PHENOLIC COMPOUNDS (II)

This is a continuation-in-part of application Ser. No. 322,979, filed Nov. 11, 1981 and now abandoned.

BACKGROUND OF THE INVENTION

The present invention relates to a catalyst system and a process for the preparation of homopolymers and copolymers of alpha monoolefins at from 20° to 160° C., especially from 50° to 120° C., and under a pressure of from 1 to 100, especially from 20 to 70, bar, by means of a catalyst system comprising (1) a titanium halide of the formula

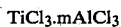
$TiCl_3 \cdot mAlCl_3$ where m is a number from 0 to 0.5, especially from 0.1 to 0.4, (2) an optional coordination complexing agent, and
(3) an aluminum-alkyl of the formula

$$X-Al-Y \atop | \atop Z$$

where X and Y are each alkyl of not more than 8, especially not more than 2, carbon atoms, and Z is chlorine or alkyl of not more than 8, especially not more than 2, carbon atoms, with the proviso that (I) the molar ratio of titanium halide (1):complexing agent (2), if present, is from 1:1 to 20:1, especially from 3:1 to 6:1, (II) the molar ratio of titanium halide (1):aluminum-alkyl (3) is from 1:1 to 1:20, especially from 1:2 to 1:15 and (III) the titanium halide (1) and the complexing agent (2), if it is used, have been milled together before use to form a coordination complex.

Processes of this type are known. Their special feature relative to comparable processes is in the specific nature of the catalyst system used, typical examples being given in U.S. Pat. Nos. 4,120,823, 4,154,699, and 4,154,700, issued Oct. 17, 1978 and May 15, 1979, respectively.

The specific modifications of the catalyst system are made in order to achieve particular objectives, for example the following:

(a) Catalyst systems which on polymerization of alpha monoolefins, especially propylene, give polymers with a relatively high proportion of stereoregular (=isotactic) polymer.

(b) Catalyst systems which can give an increased yield of polymer, namely systems of increased productivity (systems where the amount of polymer formed per unit weight of catalyst system is increased).

(c) Catalyst systems which introduce less halogen into the polymer, which is achievable by increasing the yield according to (b) and/or by employing a titanium halide which contains very little halogen.

(d) Catalyst systems which retain a constant or relatively constant activity maximum over a very long time, which is of substantial importance for the catalyst yield.

(e) Catalyst systems which make it possible, by increasing the polymerization temperature, to increase the conversion without a significant reduction in the stereoregularity of the polymers, an effect which is generally desirable, especially in dry phase polymerization.

(f) Catalyst systems by means of which—especially at relatively high polymerization temperatures—the morphological properties of the polymers can be influenced in a particular way, for example, in giving a uniform particle size and/or reducing the proportion of fines and/or giving a high bulk density. These factors may, for example, be significant in respect of technical control of the polymerization system, of working of the polymers, and/or processability of the polymers.

(g) Catalyst systems which are simple and safe to prepare and easy to handle; for example, systems which can be prepared in (inert) hydrocarbon auxiliary media.

(h) Catalyst systems which make it possible, where the polymerization is carried out in the presence of a molecular weight regulator, especially hydrogen, to manage with relatively small amounts of regulator. This can be significant; for example, in respect to the thermodynamics of the process.

(i) Catalyst systems which are tailored for specific polymerization processes; for example, catalysts which are suited either to the specific peculiarities of suspension polymerization or to the specific peculiarities of dry phase polymerization.

(j) Catalyst systems which give polymers having a pattern of properties which makes them particularly suitable for one or another field of use.

(k) Catalyst systems which provide a particularly desirable polymer morphology in finished products, such as blown films or blow-molded bottles, etc. with controlled crystallinity, uniformly nucleated spherulitic structure, and good optical clarity.

Experience to date has shown that amongst the various objectives there are some which can only be achieved by special embodiments of the catalyst system if other objectives are lowered. Under these circumstances it is, in general, desirable to find embodiments which not only achieve the particular objectives but also demand minimum lowering of other desirable objectives.

It is an object of the present invention to provide a novel embodiment of a catalyst system by means of which better results can be achieved—for similar objectives—than with conventional embodiments. I have found that this object is achieved with a catalyst system of the type defined at the outset, which contains, as a further component (4), a particular sterically unhindered phenolic compound.

It is known to use hindered phenolic compounds to achieve advantages similar to those in the present invention as disclosed in U.S. Pat. No. 4,260,710, issued Apr. 7, 1981, and based upon German Laid Open Application DAS 2,841,645. Thus, the concept of incorporating hindered phenolic anti-oxidants in a polymerization catalyst system, for the purpose of stabilizing the resin produced, is not new. It has been proposed, for example, in U.S. Pat. No. 4,170,589, in British Patent Specification No. 1,546,912, and in Netherland Patent Application No. 7,607,396. None of the above references suggest the use of unhindered phenolic compounds. In fact, the presence of a radical capable of providing steric hindrance greater than that of an ethyl group is specifically stipulated in the British Patent Specification and the Netherland Patent Application. Furthermore, it is stated in the Netherland Patent Application that when unhindered phenolic compounds are used in the catalyst in place of hindered phenolic compounds, inferior catalyst activity is the result. U.S. Pat. No. 3,150,122 discloses salicyclic acid (o-hydroxybenzoic acid) as a catalyst modifier and says that esters can be used also. This obviously is a sterically hindered compound. Furthermore, it is stated at column 6, line 15, that the phenolic compounds used therein decrease catalyst activity whereas the sterically unhindered phenolic compounds of the present invention increase catalyst activity.

I have found that the opposite is true. The unexpected and surprising features of the present invention are that the performance of the catalyst itself is improved, for example, with respect to catalyst productivity and stereospecificity, and that this improvement can be obtained in the absence of an ortho-substituent capable of providing steric hindrance.

SUMMARY OF THE INVENTION

Accordingly, the present invention relates to a catalyst system and a process for the preparation of homopolymers and copolymers of alpha monoolefins at from 20° to 160° C., especially from 50° to 120° C., under pressures of from 1 to 100 bar, especially from 20 to 20 bar, by means of a catalyst system comprising (1) titanium halide of the formula

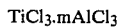

TiCl$_3$.mAlCl$_3$ where m is a number from 0 to 0.5, especially from 0.1 to 0.4, (2) an optional coordination complexing agent which can be, among many other compounds, a benzoic acid ester of the formula

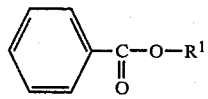

where R$^1$ is alkyl, preferably C$_1$–C$_8$, or aromatic, preferably n-butyl, and (3) an aluminum-alkyl of the formula

where X and Y are each alkyl of not more than 8, especially not more than 2, carbon atoms, and Z is chlorine or alkyl of not more than 8, especially not more than 2, carbon atoms, with the proviso that (I) the molar ratio of titanium halide (1):complexing agent (2), if used, is from 1:1 to 20:1, especially from 3:1 to 6:1, (II) the molar ratio of titanium halide (1):aluminum-alkyl (3) is from 1:1 to 1:20, especially from 1:2 to 1:15 and (III) the titanium halide (1) and the complexing agent (2), if it is used, have been milled together before use to form a coordination complex, wherein the catalyst system is employed which contains, as a further component (4), a sterically unhindered phenolic compound of the formula

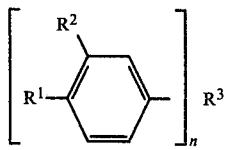

where n is an integer from 1 to 4, one of R$^1$ and R$^2$ is hydroxyl and the other is hydrogen, and R$^3$ is a saturated hydrocarbon radical of not more than 30, especially not more than 24, carbon atoms, which contains at least one and not more than 4 ether groups, ester groups, and/or ketone groups or thioether groups or sulfonyl groups, or a nitrogen-containing heterocyclic ring structure such as 1,3,5-triazine-2,4,6 (1H,3H,5H)-trione, or an aromatic ring structure such as 1,3,5-trimethyl-2,4,6-trimethylene. The molar ratio of aluminum-alkyl (3):unhindered phenolic compound should be from 1:1 to 40:1, especially from 3:1 to 25:1.

DETAILED DESCRIPTION OF THE INVENTION

The polymerization process as such can—taking into account its characterizing feature—be carried out in virtually all relevant conventional technological embodiments, i.e., as a batchwise, cyclic or continuous process, which may, for example, be a suspension polymerization process, solution polymerization process, or gas phase polymerization process. The technological embodiments mentioned are well-known from the literature and from industrial practice and do not require more detailed comments.

For completeness, it should be mentioned that in the process according to the invention, the molecular weights of the polymers can be regulated by the relevant conventional measures, e.g., by means of regulators, especially hydrogen. Further, it is to be noted that in the process according to the invention, the components of the catalyst system can be introduced into the polymerization space in various ways, for example (i) by introducing the product obtained by milling the titanium halide (1) and the coordination complexing agent (2), if used, as one component, and the aluminum-alkyl (3) and the phenolic compound (4) as two further components, all at the same place, (ii) by introducing the same three components all at different places, (iii) by introducing the product obtained by milling (1) and (2), if used, on the one hand, and a mixture of (3) and (4) on the other, at different places, which is in particular advantageous in gas phase polymerization processes and provides significant advantages in terms of productivity, or (iv) by introducing a mixture of the product obtained by milling (1) and the phenolic compound (3), on the one hand, and the aluminum-alkyl (2), on the other hand, at different places. Finally, it is to be pointed out that the advantageous features of the process according to the invention in general manifest themselves particularly if the process is carried out as a gas phase polymerization (typical examples of such polymerization processes being given in German Published Application DAS Nos. 1,217,071, 1,520,307 and 1,520,373).

One of the features of the process according to the invention is that the titanium halide (1) and the coordination complexing agent (2), when used, are advantagously milled together before use. This milling can again be carried out by relevant conventional methods, most simply by conjointly treating the two components in a vibratory mill, especially a vibratory ball mill, for a period of from 1 to 100 hours, preferably from 2 to 50 hours, at from −80° C. to 120° C., preferably from −30° C. to 80° C., with a milling acceleration of from 30 to 80 m.sec$^{-2}$, in the presence or, preferably, in the absence of a diluent. However, milling can also be carried out by special methods, for example, those described in U.S. Pat. Nos. 4,120,823, 4,154,699, and 4,154,700, referred to above.

Regarding the materials used in the novel catalyst system, the following details should be noted:

The titanium halide (1) employed can be a titanium halide, for example, a reaction product obtained on reducing a titanium tetrahalide with hydrogen, aluminum or an aluminum-organic compound. Compounds which have proved very suitable are, for example, trichlorides of the formula TiCl$_3$, as obtained by reducing titanium tetrachloride with hydrogen, and especially co-crystals, as obtained by co-crystallizing TiCl$_3$ and AlCl$_3$ or reducing TiCl$_4$ with aluminum or with mixtures of aluminum and titanium. Co-crystals of the formula TiCl$_3.\frac{1}{3}$AlCl$_3$ are particularly suitable. The appropriate titanium halides (1) are commercially available and hence do not require further comment.

It is not necessary that any coordination complexing agent (2) be used with the catalyst of the present invention. However, if it is desired to use such a complexing agent, suitable agents are organic phosphines, ethers such as disclosed in U.S. Pat. Nos. 4,120,823 and 4,154,700, and esters as disclosed in U.S. Pat. No. 4,154,699. Suitable benzoic acid ester complexing agents (2) having the formula shown are again the relevant conventional compounds of this formula, e.g., those where R$^1$ is methyl, ethyl, n-propyl, n-butyl, methyl, ethyl, n-propyl, n-butyl, i-propyl, i-butyl, or tert.-butyl. Typical examples of very suitable benzoic acid esters (2) are ethyl, butyl, and benzyl benzoate, especially butyl benzoate.

Suitable aluminum-alkyls (3) of the stated formula are again the relevant conventional compounds of this formula. These are so well known from the literature and from industrial practice that they do not require more detailed discussions here. Particularly important examples are triethylaluminum and diethylaluminum chloride.

Regarding the sterically unhindered phenolic compounds (4), the use of which is characteristic of the invention, it must be noted that the steric hindrance referred to herein relates only to the presence of hindering groups in the ortho position with respect to the hydroxyl. Smaller groups, such as methyl, methoxy, and ethyl, do not cause a high degree of steric hindrance but it is preferred that they not be in the ortho position in these compounds (4). The most suitable phenolic derivatives for use in this invention are compounds which react rapidly with alkylaluminum compounds such as triethylaluminum and/or diethylaluminum chloride, preferably in a hydrocarbon solution.

Typical examples of very suitable compounds of the stated formula are those where R$^3$ is —(CH$_2$)$_x$COOR$^4$, where x may be 0, 1, or 2 and R$^4$ is methyl, ethyl, n-propyl, n-butyl, n-pentyl, 2-ethylhexyl, or n-octyl. Some of the preferred phenolic derivatives are compounds which contain linear or branched aliphatic or alicyclic hydrocarbon substituents which contribute to good solubility but do not cause steric hindrance. Said phenolic derivatives may also have substituents containing ether and/or ester or ketone or sulfur-containing groups. Examples of suitable compounds are the methyl, ethyl, propyl, butyl, pentyl, 2-ethyl-hexyl, or phenyl esters of p-hydroxybenzoic acid, m-hydroxybenzoic acid, as well as methyl, ethyl, propyl, butyl, pentyl, 2-ethyl-hexyl, p-hydroxyphenyl acetic or propionate.

The process according to the invention makes it possible to prepare homopolymers and coopolymers of alpha monoolefins in an advantageous manner, particularly suitable polymerizable alpha monoolefins being ethylene, propylene, butene-1, and 4-methylpentene-1 and copolymers thereof with ethylene.

EXAMPLE 1

Preparation of Basic Catalyst Component

Approximately 10 pounds of aluminum-reduced activated titanium trichloride, TiCl$_3$AA, with a composition of TiCl$_3.\frac{1}{3}$AlCl$_3$, was premilled for 16 hours in a nitrogen-purged, refrigerated vibratory ball mill at −18° C. to 0° C. The mill was then stopped and cooled at rest for 6 hours to −26° C. Milling was then resumed and the cooling was continued while butyl benzoate was metered in at the rate of 1100–1200 ml/hr until the mixture contained about 19 percent of the added ester compound. The temperature was then raised to 40° C. and milling was continued for 20 hours. Then the temperature was further increased to 50° C. and milling was continued for another 14 hours. The mill was than cooled at rest for about 10 hours to −26° C. and the product was post-milled for 20 minutes with continued cooling. The batch was then discharged from the mill.

EXAMPLE 2

Polymerization of Propylene

A solution was prepared containing 1.75 millimoles of n-octyl p-hydroxybenzoate in 1300 ml of pure, dry-n-heptane. Under a dry nitrogen atmosphere, 24.5 millimoles of the diethylaluminum chloride (DEAC) was injected into the solution and the mixture was heated to 60° C. The components were allowed to react for 15 minutes. Then 859 milligrams of the catalyst component from Example 1 containing 3.50 millimoles of TiCl$_3$ was added to the mixture. The molar ratio of DEAC to n-octyl p-hydroxybenzoate to TiCl$_3$ was 7/0.5/1. The temperature was raised to 74° C. and purified propylene was bubbled through the slurry at the rate of 50 liters per hour at atmospheric pressure for five hours. The polymer yield was 108 g. representing a catalyst productivity of 200 g polypropylene/g TiCl$_3$. The heptane-insoluble fraction amounted to 96.3 percent.

EXAMPLE 3

A comparison experiment was conducted in substantially the same manner as described in Example 2, except that a sterically hindered antioxidant, IRGANOX 1076 (octadecyl-3,5-di-tert-butyl-4-hydroxyhydrocinnamate), manufactured by CIBA-GEIGY Corp., was substituted for the hydroxybenzoate ester. The polymerization was run under the same conditions and with the same mole ratio of components of the catalyst system. In this case, the productivity obtained was 220 g of polypropylene per gram of titanium trichloride. The heptane-insoluble fraction was 96.1 percent.

EXAMPLE 4

A comparison experiment was conducted in substantially the same manner as described in Example 2, except that the hydroxybenzoate ester was omitted. The mole ratio of DEAC/TiCl$_3$ was 7/1. In this case, the productivity obtained was 182.6 g polypropylene/g TiCl$_3$; the heptene-insoluble fraction was 95.6 percent. Thus, it can be seen that both the sterically hindered (Example 3) and unhindered (Example 2) phenolic compounds substantially increase the activity of the catalyst and the heptane insolubles content of the polymer.

EXAMPLE 5

A heptane slurry polymerization of propylene was carried out using a catalyst system consisting of the 2-ethylhexyl ester of p-hydroxybenzoic acid (ArOH), diethylaluminum chloride, and the catalyst component from Example 1. The mole ratio employed was DEAC/ArOH/TiCl$_3$=7/0.5/1. The productivity after 3 hours at 74° C. was 102 g polypropylene/g TiCl$_3$ and the heptane-insoluble fraction was 97.0 percent.

EXAMPLE 6

Another polymerization was carried out in a similar manner as described in Example 5, except that a mixed aluminum alkyl system was used. The 2-ethylhexyl ester of p-hydroxybenzoic acid was pre-reacted with triethylaluminum at a 1/1 mole ratio for 15 minutes at 60° C. before the other components were added. The overall mole ratio was DEAC/TEAL/ArOH/TiCl$_3$=6.5/0.5/0.5/1. The productivity after 3 hours at 74° C. was 122.6 g polypropylene/g TiCl$_3$. The heptane-insoluble fraction was 96.7 percent.

EXAMPLE 7

0.5032 g of n-octyl p-hydroxybenzoate was dissolved in 20 ml of pure, dry n-heptane. 18.1 ml of a 25 percent solution of diethylaluminum chloride in heptane was injected under a nitrogen atmosphere. After allowing 15 minutes for reaction, 0.9785 g of a butyl benzoate-complexed, ball-milled catalyst containing 0.615 g of titanium trichloride was added in a glove box in a dry purified nitrogen atmosphere. The catalyst was dispersed ultrasonically for 20 minutes, and the slurry was transferred to a stirred polymerization reactor containing 1300 ml of pure, dry n-heptane. The reactor was heated to the polymerization temperature (74° C.) and purified propylene was fed at the rate of 50 standard liters per hour for 3 hours. The polymer yield was 101.3 g, representing a catalyst productivity of 164.7 g polypropylene/g TiCl$_3$. The heptane-insoluble fraction of the polymer amounted to 97.2 percent.

EXAMPLE 8

The procedure described in Example 7 was repeated using 0.5178 g of 2-ethylhexyl p-hydroxybenzoate, 18.7 ml of 25 percent DEAC solution, and 1.0013 g of butyl benzoate-complexed, ball-milled catalyst containing 0.629 g TiCl$_3$. The polymer yield was 102.3 g, the productivity was 162.6 g polypropylene/g TiCl$_3$, representing an average catalyst activity of 54.2 g polypropylene/g TiCl$_3$ per hour per atmosphere, and the heptane-insoluble fraction was 97.0 percent.

EXAMPLE 9

0.338 g of methyl p-hydroxybenzoate was added to a stirred two-liter reactor containing 1300 ml of pure, dry, nitrogen-purged n-heptane. The mixture was warmed to 60° C., and 20.2 ml of a 25 percent, 1.547-molar solution of diethylaluminum chloride (DEAC) in heptane was injected. The components were allowed to react for 15 minutes. Then 0.8542 g of aluminum-reduced activitated titanium trichloride (TiCl$_3$AA) with the composition of TiCl$_3$.⅓AlCl$_3$ was introduced, which contains 0.663 g of TiCl$_3$. The propylene was fed to the reactor at the rate of 50 standard liters per hour for five hours. The polymer yield was 91.6 g, representing a catalyst productivity of 138.2 g PP/g TiCl$_3$. The heptane-insoluble fraction was 97.0 percent.

EXAMPLE 10

In a comparison experiment, the procedure of Example 9 was repeated, but the addition of hydroxybenzoate ester was omitted. In this case, the productivity was 122.8 g PP/g TiCl$_3$; the heptane-insoluble fraction was 95.6 percent. Thus, it can be seen that the addition of an unhindered phenolic compound to the catalyst increases its activity and the stereospecificity of the polymer produced.

EXAMPLE 11

0.331 g of butyl p-hydroxybenzoate was dissolved in 1300 ml of n-heptane in a two-liter stirred reactor and warmed to 60° C. under a nitrogen atmosphere. Then 15.4 ml of a 25 percent solution of DEAC in heptane was injected. The components were allowed to react for 15 minutes. Then 0.8355 g of a ball-milled catalyst was added, which had been prepared from TiCl$_3$AA and ethyl phenylacetate in the mole ratio of 3/1 and contained 0.508 g of TiCl$_3$. The temperature was raised to 74° C., and propylene was fed to the reactor for five hours at the rate of approximately 50 l/hr. The polymer yield was 88.9 g, representing a catalyst productivity of 175.0 g PP/g TiCl$_3$. The heptane-insoluble fraction was 97.7 percent.

EXAMPLE 12

In a comparison experiment, the procedure of Example 11 was repeated omitting the addition of the hydroxybenzoate ester. In this case, the productivity was 156.1 g PP/g TiCl$_3$; the heptane-insoluble fraction, 96.7 percent. Thus, the unhindered phenolic compound increased both activity and heptane-insolubles for a catalyst complexed with ethyl phenylacetate.

EXAMPLE 13

0.495 g of n-pentyl p-hydroxybenzoate was dissolved in 1300 ml of pure, dry, nitrogen-purged n-heptane contained in a two-liter stirred reactor, and the solution was warmed to 60° C. Then 21.6 ml of a 25 percent, 1.547-molar solution of DEAC in heptane was injected and allowed to react for 15 minutes. 1.0704 g of a ball-milled catalyst containing 0.710 g of TiCl$_3$, prepared from TiCl$_3$AA and tributylphosphine in the mole ratio of 6/1, was added under a nitrogen atmosphere. The temperature was raised to 74° C., and propylene was fed at the rate of 50 l/hr for five hours. The polymer yield was 110.4 g, representing a productivity of 155.5 g PP/g TiCl$_3$. The heptane-insoluble fraction was 95.8 percent.

EXAMPLE 14

In a comparison experiment, the procedure of Example 13 was repeated omitting the addition of the hydroxybenzoate ester. In this case, the productivity was 132.2 g PP/g TiCl₃; the heptane-insoluble fraction, 94.4 percent. The addition of an unhindered phenolic compound increased activity and heptane-insolubles for a catalyst complexed with tributylphosphine.

I claim:

1. A catalyst for the preparation of homopolymers and copolymers of alpha monoolefins which comprises (1) a titanium halide of the formula

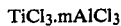

where m is a number from 0 to 0.5, (2) an aluminum-alkyl of the formula

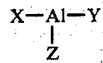

where X and Y are each alkyl of not more than 8 carbon atoms, and Z is chlorine or alkyl of not more than 8 carbon atoms, with the proviso that the molar ratio of titanium halide:aluminum-alkyl is from 1:1 to 1:20, wherein the catalyst contains, as a further component (3) a sterically unhindered phenolic compound of the formula

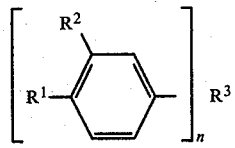

where n is an integer from 1 to 4; one of $R^1$ and $R^2$ is hydroxyl and the other is hydrogen; and $R^3$ is —$(CH_2)_xCOOR^4$, where x may be 0, 1, or 2, and $R^4$ is methyl, ethyl, n-propyl, n-butyl, n-pentyl, 2-ethylhexyl, or n-octyl; with the proviso that the molar ratio of aluminum-alkyl:phenolic compound is from 1:1 to 40:1.

2. The catalyst of claim 1 wherein a cordination complexing agent is included and the molar ratio of titanium halide:complexing agent is from 1:1 to 20:1 and the titanium halide and the complexing agent have been milled together before use.

3. The catalyst of claim 2 wherein the complexing agent is a benzoic acid ester of the formula

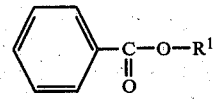

where $R^1$ is alkyl or aromatic.

4. The catalyst of claim 1 wherein the phenolic compound is selected from the group consisting of the methyl, ethyl, propyl, butyl, pentyl, ethylhexyl, and octyl esters of p-hydroxybenzoic acid, m-hydroxybenzoic acid, p-hydroxyphenylacetic acid, and p-hydroxyphenyl propionic acid.

5. The catalyst of claim 1 wherein the aluminum-alkyl is diethylaluminum chloride.

6. The catalyst of claim 1 wherein the aluminum-alkyl and the phenolic compound are pre-mixed and then added to the other components.

* * * * *